United States Patent
Bills et al.

(10) Patent No.: US 11,447,600 B2
(45) Date of Patent: Sep. 20, 2022

(54) POLYOLEFIN DISPERSION AND EPOXY DISPERSION BLENDS FOR IMPROVED DAMAGE TOLERANCE

(71) Applicant: Dow Global Technologies LLC, Midland, MI (US)

(72) Inventors: Robert R. Bills, Midland, MI (US); Liang Chen, Sewickley, PA (US); David L. Malotky, Midland, MI (US); Jay D. Romick, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 206 days.

(21) Appl. No.: 16/092,458

(22) PCT Filed: May 1, 2017

(86) PCT No.: PCT/US2017/030341
§ 371 (c)(1),
(2) Date: Oct. 10, 2018

(87) PCT Pub. No.: WO2017/192419
PCT Pub. Date: Nov. 9, 2017

(65) Prior Publication Data
US 2021/0301073 A1    Sep. 30, 2021

(51) Int. Cl.
| | | |
|---|---|---|
| C08G 59/42 | (2006.01) | |
| C09D 7/48 | (2018.01) | |
| C09D 163/00 | (2006.01) | |
| C09D 123/26 | (2006.01) | |
| B01F 23/41 | (2022.01) | |

(52) U.S. Cl.
CPC ...... *C08G 59/4261* (2013.01); *B01F 23/4146* (2022.01); *C09D 7/48* (2018.01); *C09D 123/26* (2013.01); *C09D 163/00* (2013.01)

(58) Field of Classification Search
CPC ......... C09D 123/26; C09D 163/00–10; C08L 63/00–10; C08L 23/26; C08L 51/06; B01F 23/4146; B01F 23/50–566; C08J 2323/26
See application file for complete search history.

(56) References Cited

U.S. PATENT DOCUMENTS

| | | | |
|---|---|---|---|
| 3,645,992 A | 2/1972 | Dow | |
| 3,900,440 A | 8/1975 | Ohara et al. | |
| 4,076,698 A | 2/1978 | Anderson et al. | |
| 4,552,920 A | 11/1985 | Goto et al. | |
| 4,906,690 A | 3/1990 | Hasenbein et al. | |
| 5,272,236 A | 12/1993 | Lai et al. | |
| 5,278,272 A | 1/1994 | Lai et al. | |
| 5,504,172 A | 4/1996 | Imuta et al. | |
| 5,767,188 A * | 6/1998 | Kamikuri | C09D 151/06 524/507 |
| 8,680,198 B2 | 3/2014 | Malotky et al. | |
| 2009/0163635 A1 | 6/2009 | Raynolds et al. | |
| 2015/0147501 A1 | 5/2015 | Lindenmuth et al. | |
| 2015/0225517 A1 | 8/2015 | Ohtani et al. | |
| 2016/0222220 A1 * | 8/2016 | Hoshikawa | C08G 59/50 |

FOREIGN PATENT DOCUMENTS

| | | |
|---|---|---|
| EP | 239347 A1 | 9/1987 |
| EP | 0747441 A2 | 12/1996 |
| JP | H07304913 A | 11/1995 |
| JP | H11269206 A | 10/1999 |
| JP | 2002003657 A | 1/2002 |
| JP | 2006241623 A | 9/2006 |
| WO | 1992000364 A1 | 1/1992 |
| WO | 1995017466 A1 | 6/1995 |
| WO | 2015191280 A2 | 12/2015 |

OTHER PUBLICATIONS

Japanese Office Action for the corresponding Japanese Application No. 2018-552181; Date of drafting: Mar. 4, 2021; English translation, 4 pages.

* cited by examiner

*Primary Examiner* — Kregg T Brooks
(74) *Attorney, Agent, or Firm* — Andrew Merriam

(57) ABSTRACT

The present invention provides aqueous compositions for making damage tolerant coatings comprising a blend of (i) from 2 to 30 wt. %, based on the total weight of solids in the composition, of an acid or anhydride functionalized polyolefin dispersion having an average particle size of from 0.2 to 5 microns, and (ii) a film forming dispersion of one or more epoxy resins chosen from epoxy resins having an epoxy equivalent weight (EEW) of from 150 to 4,000 having an average particle size of from 0.2 to 1.0 microns, wherein the polyolefin dispersion is stabilized with from 2 to 8 wt. %, based on the total weight of solids in the composition, one or more anionic surfactants, such as a sulfate containing surfactant, and, further wherein, the compositions have a pH of from 3 to 8.

17 Claims, No Drawings

POLYOLEFIN DISPERSION AND EPOXY DISPERSION BLENDS FOR IMPROVED DAMAGE TOLERANCE

The present invention relates to aqueous polyolefin dispersion and epoxy dispersion blends for use in coatings and comprising from 2 to 30 wt. % of one or more acid or anhydride functionalized polyolefin dispersions (POD) blended with an epoxy resin aqueous dispersion.

Epoxy resins have found use in a variety of applications, including coatings, moldings and adhesives. In the past, epoxy resins have proven easily damaged as they cure to give brittle products that exhibit crazing and poor impact resistance and flexibility. Improvements in the damage tolerance of epoxy coatings has been achieved via a variety of approaches including the addition of rubbers, dried latexes, or block polymers, modification of the epoxy, and melt blending epoxy with polyolefins. However, each of these approaches has suffered from a selection of issues, such as a lack of compatibility between resin and additives, difficulty with or inconsistency in chemical modifications, and the need for solvents to facilitate handling.

U.S. Pat. No. 8,680,198 to Malotky et al. discloses high solids aqueous polymer composite dispersions having a first internal phase and a second internal phase for making, among other things, coatings. The Malotky et al. compositions include many resins and polymers that are not conventionally polymerized in aqueous media, including epoxy resins, polysiloxanes and polyolefins. However, the Malotky et al. compositions fail to provide aqueous compositions that form damage tolerant epoxy resin coatings.

The present inventors have endeavored to solve the problem of providing aqueous compositions that enable a coating or film to have improved damage tolerance without adversely affecting the other performance properties (i.e. corrosion resistance, gloss, hardness, chemical resistance).

STATEMENT OF THE INVENTION

1. In accordance with the present invention, aqueous compositions comprise a blend of (i) from 2 or more wt. %, or up to 30 wt. %, or, preferably, from 3.5 to 25 wt. %, or, more preferably, 5 wt. % or more or 20 wt. % or less, or, more preferably, from 10 to 18 wt. %, based on the total weight of solids in the composition, of a functionalized polyolefin dispersion containing an acid functionalized polyolefin, an anhydride functionalized polyolefin, or an epoxy adduct thereof, preferably, an anhydride functionalized polyolefin dispersion, the functionalized polyolefin dispersion having an average particle size of from 0.2 to 5 microns, or, preferably, from 0.3 to 0.9 microns, or, more preferably, from 0.55 to 0.8 microns, and (ii) a dispersion of one or more epoxy resins, preferably, linear or difunctional glycidyl ethers of polyols, chosen from epoxy resins having an epoxy equivalent weight (EEW) of from 150 to 4,000, for example, from 150 to 2000, or, preferably, from 150 to 1000, and having an average particle size of from 0.2 to 1.0 microns, preferably, from 0.3 to 0.6 microns, wherein the functionalized polyolefin dispersion is stabilized with from 2 to 8 wt. %, or, preferably, from 3 to 6 wt. %, based on the total weight of solids in the composition, one or more anionic surfactants, such as a sulfate group containing surfactant, for example, a lauryl sulfate alkali metal salt or an ethoxylated lauryl sulfate alkali metal salt, and, further wherein, the compositions have a pH of from 3 to 8, or, preferably, from 3 to 7.4, or up to 7.

2. The aqueous compositions in accordance with 1, above, wherein the particle size ratio of the (i) functionalized polyolefin dispersion to the (ii) epoxy dispersion ranges from 10:1 to 1:2 or, preferably, from 5:1 to 1:1, more preferably 3:1 to 1:0.85.

3. The compositions in accordance with 1 or 2, above, wherein the (i) acid or anhydride functionalized polyolefin dispersion or epoxy adduct thereof contains from 0.1 to 2.0 wt. %, or, preferably, from 0.14 to 1.5 wt. %, of acid or anhydride groups, such as maleic anhydride groups in polymerized form, based on the total solids weight of the polyolefin dispersion.

4. The aqueous compositions in accordance with any of 1, 2 or 3, above, wherein the (i) acid or anhydride functionalized polyolefin dispersion is chosen from an acid functionalized polyolefin, an anhydride functionalized polyolefin, an epoxy adduct of an acid functionalized polyolefin, an epoxy adduct of an anhydride functionalized polyolefin, and mixtures of any of the foregoing with one or more polyolefins which are not acid or anhydride functionalized.

4A. The aqueous compositions in accordance with item 4, above, further wherein, the polyolefin in the acid or anhydride functionalized polyolefin is chosen from a polyolefin elastomer, a high density polyethylene, ethylene-propylene copolymers, polypropylenes, olefin block copolymers, polyolefin plastomers, linear low density polyethylene, and ethylene-$C_4$ to $C_{12}$ olefin copolymers.

5. The aqueous compositions in accordance with 1, 2, 3, 4 or 4A, above, wherein the (i) functionalized polyolefin dispersion further comprises an acid functional modified polyolefin, preferably, a maleic anhydride polyolefin copolymer or a maleic anhydride modified polyolefin wax.

6. The aqueous compositions in accordance with any of 1, 2, 3, 4, 4A or 5, above, further comprising an epoxy hardener, such as a polyamine, a diamine, an amine epoxy adduct, a dicarboxylic acid or a carboxylic acid group containing polymer, such as polyacrylic acid.

6A. The aqueous compositions in accordance with 6, above, wherein the ratio of the total number of amine hydrogen molar equivalents and/or moles of carboxylic acid in the epoxy hardener to the total number of moles of epoxy equivalents in the one or more epoxy resins in the (ii) epoxy resin dispersion ranges from 0.7:1 to 2.4:1, or, preferably, from 0.8:1 to 2.3:1, or, more preferably, from 1.4:1 to 2.25:1.

7. The aqueous compositions in accordance with any of 1, 2, 3, 4, 4A, 5, 6 or 6A, above, which is solvent free or is substantially solvent free.

8. The aqueous compositions in accordance with any of 1, 2, 3, 4, 4A, 5, 6, 6A or 7 above, wherein the acid or anhydride functionalized polyolefin dispersion is at least partially neutralized with a base, such as ammonia, a volatile amine or caustic.

9. The aqueous compositions in accordance with any of 1, 2, 3, 4, 4A, 5, 6, 6A, 7, or 8, above, further comprising one or more pigments, such as $TiO_2$, fillers and/or extenders, such as calcium carbonate, silicates or silica.

10. In another aspect, the present invention comprises a coating on a substrate or a film made from the compositions of any of 1 to 9, above.

11. A method of making the aqueous compositions of any of 1 to 10 above, comprising combining (i) one or more aqueous acid functionalized or anhydride functionalized polyolefin dispersion or an epoxy adduct thereof in dispersion (ii) and one or more aqueous epoxy resin dispersions comprising one or more surfactant, such as an epoxy functional nonionic surfactant.

12. The method in accordance with item 11 of the present invention, wherein an epoxy adduct of the aqueous acid functionalized or anhydride functionalized polyolefin is formed by dissolving in a rotor stator mixer an acid or anhydride functionalized polyolefin in a suitable solvent, such as toluene, with one or more epoxy resins, followed by dispersing the resulting mixture in water and removing the solvent to form a (i) functionalized polyolefin dispersion, and then blending it with (ii) an aqueous epoxy dispersion.

13. The method in accordance with item 11 of the present invention comprising extruding or kneading an epoxy resin in water with one or more surfactant, preferably, an epoxy functional nonionic surfactant or a mixture thereof with an anionic surfactant, to form (ii) an aqueous epoxy resin dispersion having an epoxy equivalent weight (EEW) of from 150 to 4,000, for example, from 150 to 2000, or, preferably, from 150 to 1000, and having an average particle size of from 0.2 to 1.0 microns, and, separately, extruding or kneading acid or anhydride functionalized polyolefin or an epoxy adduct thereof in water with from 2 to 8 wt. %, based on the total weight of solids in the aqueous composition, of an anionic surfactant to form a (i) functionalized polyolefin dispersion having an average particle size of from 0.2 to 5 microns and blending the (i) functionalized polyolefin dispersion with (ii) the epoxy dispersion.

Unless otherwise indicated, all temperature and pressure units are room temperature and standard pressure (STP).

All phrases comprising parentheses denote either or both of the included parenthetical matter and its absence. For example, the phrase "(meth)acrylate" includes, in the alternative, acrylate and methacrylate.

All ranges recited are inclusive and combinable. For example, a disclosure of an average particle size of from 0.2 to 1.0 microns, preferably, from 0.3 to 0.6 microns will include an average particle size of from 0.2 to 1.0 microns, from 0.2 to 0.3 microns, from 0.2 to 0.6 microns, from 0.6 to 1.0 microns, from 0.3 to 1.0 microns, or, preferably, from 0.3 to 0.6 microns.

As used herein, unless otherwise indicated, the term "amine hydrogen equivalent weight" or AHEW means the amount in grams of an amine that yields one molar equivalent of hydrogen in reaction as measured by titration using ASTM D 2074-07 (2007).

As used herein, unless otherwise indicated, the term "average particle size" means a volume mean particle size, as determined using a Coulter LS 13230 particle size analyzer (Beckman Coulter, Fullerton, Calif.) per manufacturer's recommended procedures via laser scattering).

As used herein, the term "ASTM" refers to the publications of ASTM International, West Conshohocken, Pa.

As used herein, the term "EEW" or "epoxy equivalent weight" means the amount determined using a Metrohm 801 Robotic USB sample processor XL and two 800 Dosino-™dosing devices for the reagents (Metrohm USA, Tampa, Fla.). The reagents used are perchloric acid in acetic acid 0.10 N and tetraethylammonium bromide. The electrode for the analysis is an 854 Iconnect™ electrode (Metrohm). For each sample, 1 g of dispersion is weighed out into a plastic sample cup. Then 30 mL of THF (tetrahydrofuran) is first added and mixed for 1 minute (min) to break the shell on the dispersion. Next, 32 mL of glacial acetic acid is added and mixed for another 1 min to fully dissolve the sample. The sample is then placed on the auto sampler and all relevant data (e.g., sample ID, sample weight) is added to the software. From here the start button is clicked to start the titration. Thereafter, 15 mL of tetraethylammonium bromide is added, and then the perchloric acid is slowly added until a potentiometric endpoint is reached. Once the potentiometric endpoint is reached, the software calculates an EEW value based on the amount of sample and perchloric acid used.

As used herein, the term "glass transition temperature" or "measured Tg" refers to the mid-point glass transition temperature of a polymer as determined by differential scanning calorimetry (DSC) scanning from −150° C. to 150° C. while ramping temperature in a sinusoidal modulation (oscillation) pattern overlayed on a conventional linear heating ramp at a ramp rate of 2.00° C./min to 150.00° C., taking the mid-point in the heat flow versus temperature transition as the Tg value.

As used herein, the term "Melt index" means the value determined according to ASTM D-1238 (2013). Melt index values are defined as the amount of polymer melt passing in dg/min (or g/10 min) through a heated syringe with a plunger load at 190° C. and 2.16 kg load for polyethylene polymer and at 230° C. and 2.16 kg load for polypropylene polymer. For olefin copolymers, the polypropylene melt index test will be used if more than 50 wt. % of the copolymer comprises propylene in polymerized form.

As used herein, the term "melting point" means the value determined by DSC method using a ramp rate of from 10° C./min.

As used herein, the term "phr" means the amount of a material based on one hundred weight parts of resin solids.

As used herein, the term "solids" refers to the wt. % in compositions of solids of the polyolefins, epoxy resins, dispersants and stabilizing agents and, when present, pigments, fillers or extenders and any additives that are not volatile under use conditions for the compositions of the present invention. For example, water, additives such as coalescents and solvents or bases, like ammonia or lower alkyl amines that volatilize under use conditions of the compositions of the present invention are not considered solids.

As used herein, the term "substantially solvent free" means that the total solids amounts of such materials, based on the total solids of the compositions ranges 1200 ppm or less or, preferably, 500 ppm or less.

As used herein, the term "volatile base" means a base that volatilizes at standard pressure at a temperature of from room temperature to 200° C.

As used herein, the term "wt. %" refers to weight percent.

The aqueous compositions of the present invention provide a composite film or coating which has improved damage tolerance properties. A polyolefin dispersion (POD) containing maleic acid or anhydride (MAH) functional groups, or epoxy adducts of such functional groups, and an epoxy resin aqueous dispersion is used to make a film with better impact resistance than the epoxy film alone, while retaining or improving hardness, corrosion resistance, and chemical resistance. The functionalized polyolefin dispersion (POD) is combined with the epoxy dispersion to form the aqueous compositions of the present invention so that the POD is well dispersed in the epoxy resin. These POD particles act as toughening agents in the epoxy film, where the POD particles are dispersed within an epoxy matrix. In the absence of the functionality, the POD is not well dispersed in the epoxy and the performance properties are worse than that of the epoxy by itself. In accordance with the present invention, the polyolefin with generally larger particle sizes, is dispersed in the epoxy resin continuous phase, thereby retaining the properties of an epoxy resin while providing damage tolerant coatings.

The (i) functionalized polyolefin dispersions of the present invention comprise an aqueous polyolefin dispersion of one or more acid or anhydride functionalized polyolefins or epoxy adducts thereof, wherein the polyolefins used to make the functionalized polyolefin dispersions have a melting point of at least 50° C., or up to 180° C., or, preferably, at least 60° C. or, preferably, at least 65° C., or, preferably up to 140° C.

Suitable polyolefins for use in making the acid or anhydride functionalized polyolefin dispersions of the present invention may comprise any such functionalized polyolefin having the requisite 0.2 to 5 micron average particle size. For example, suitable polyolefins may be an ethylene polymer, propylene polymer, propylene/ethylene copolymer, and combinations thereof. Suitable primary polyolefin dispersion polymers may include high density polyethylene (HDPE), polypropylene, ethylene-ethyl acrylate copolymers and olefin block copolymers, such as ethylene-butylene and ethylene octene copolymers.

Specific examples of the groups that can modify the polyolefin of the present invention include, but are not limited to, unsaturated cyclic anhydrides and their aliphatic diesters, and the diacid derivatives. For example, maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid, and combinations thereof.

The acid or anhydride functionalized polyolefins of the present invention can have an acid number of from 5 to 60, less than 50 or, more than 7. Acid number can be determined by ASTM D-1386 (2010). Acid number can refer to an amount of KOH in mg KOH/g polymer required to neutralize acid functionality when measured by titration. Alternatively, the percent functionality can be determined by Fourier Transform Infrared Spectroscopy (FTIR).

Specific examples of functionalized polyolefins may include, for example, maleic anhydride functionalized polyethylenes, polypropylenes, copolymers of ethylene and propylene, copolymers of ethylene and octene, epoxy resin adducts thereof, and combinations thereof. Examples include, but are not limited to maleic anhydride functionalized polyethylene, such as high density polyethylene, maleic anhydride functionalized polyethylene copolymers, terpolymers and blends may also be used. Maleic anhydride functionality can be incorporated into the polymer by grafting or other reaction methods. When grafting, the level of maleic anhydride incorporation is typically below 3 percent by weight based on the weight of the polymer.

Suitable ethylene polymers for acid or anhydride modification can be selected from the group consisting of polyethylene, an ethylene-copolymer and a combination thereof. Exemplary ethylene polymers can also include homogeneous polymers, as for example described in U.S. Pat. No. 3,645,992; high density polyethylene (HDPE), as for example described in U.S. Pat. No. 4,076,698; homogeneously branched, linear ethylene/propylene copolymers; homogeneously branched, substantially linear ethylene/propylene polymers, which can be prepared, for example, by processes disclosed in U.S. Pat. Nos. 5,272,236 and 5,278,272; and ethylene octene polymers. The ethylene polymers should have a melting point of 60 to 180° C.

Available ethylene polymers, propylene/ethylene, ethylene/octene copolymers for acid or anhydride modification include, but are not limited to, polymers available as Affinity™GA1000R, AMPLIFY™GR-204, VERSIFY™ DP-4000.01; VERSIFY™ 4200, VERSIFY™ 4000, VERSIFY™ 3200, VERSIFY™ 3000, and VERSIFY™ 3300 polymers (The Dow Chemical Company, Midland, Mich.), ENGAGE™ 8407 polymer (Dow), INFUSE™ 9807 polymer (Dow); Vistamaxx™ propylene-containing elastomers (ExxonMobil Chemical, Houston, Tex.); commercially available high density polyethylenes such as, but are not limited to, DMDA-8007 NT 7 (Melt Index 8.3, Density 0.965), DMDC-8910 NT 7 (Melt Index 10, Density 0.943), DMDA-1210 NT 7 (Melt Index 10, Density 0.952), HDPE 17450N (Melt Index 17, Density 0.950), DMDA-8920 NT 7 (Melt Index 20, Density 0.954), DMDA 8940 NT 7 (Melt Index 44, Density 0.951), DMDA-8950 NT 7 (Melt Index 50, Density 0.942), DMDA-8965-NT 7 (Melt Index 66, Density 0.952), DMDA-8940 HDPE (Melt Index of approximately 40-48 g/10 min), all from the Dow Chemical Company.

Suitable propylene polymers for acid or anhydride modification or the modification and subsequent adduction to epoxy resins can include, but are not limited to, 6D43 Polypropylene (Braskem, Philadelphia, Pa.). Generally, the propylene polymer has substantially isotactic propylene sequences. "Substantially isotactic propylene sequences" means that the sequences have an isotactic triad (mm) measured by $^{13}C$ NMR of greater than 0.85, or, greater than 0.90 or, greater than 0.92; or, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

The (i) functionalized polyolefin dispersions of the present invention comprise one or more anionic surfactants, which can be a sulfate group containing surfactant, such as sodium lauryl sulfate, sulfonate group containing surfactant, or a sulfoxylate containing surfactant.

The (i) functionalized polyolefin dispersions of the present invention have a 0.2 to 5 micron average particle size, preferably from 400-800 nm. The average particle size of the (ii) aqueous epoxy dispersions of the present invention is generally smaller than that of the aqueous functionalized polyolefin dispersion compositions, but may be equal to or larger than average particle size of the functionalized polyolefin dispersion.

For stability of the aqueous dispersions compositions, the epoxy resins useful in the present invention are generally linear epoxy resins or epoxy resins, such as bis-glycidyl ethers of diols, polyetherpolyols or bisphenols. Such epoxy resins remain dispersed in the aqueous dispersion compositions of the present invention containing acid or anhydride functionalized polyolefins. Suitable epoxy resins can be any solid epoxy resins, such as those having an epoxy equivalent weight (EEW) of from 150 to 4,000, for example, from 150 to 2000, or, preferably, from 150 to 1000. Further, the epoxy resins can be pre-advanced or b-stage resins that comprise the condensation product of excess epoxy resins with hardeners to yield epoxy resins.

Aqueous dispersion compositions of type I epoxy resins or those having an EEW of 500 ??? or less may be film forming. For epoxy resins having a higher EEW, one or more coalescents or co-solvents may be included in the composition in amounts as needed to enable film formation.

In some instances, to facilitate dispersion in aqueous media, a base, for example, an amine such as monoethanolamine, dimethylamine (DMEA), or 2-amino-2-methyl-1-propanol (AMP), can be included in the aqueous compositions of without destabilizing the compositions of the present invention and so long as the pH remains within the desired level of the present invention.

The aqueous phase of the compositions of the present invention may be, for example, water; or in the alternative, the aqueous phase may be a mixture of water and one or more organic solvents, e.g. one or more water miscible solvents or one or more water immiscible solvents, or combinations thereof. The acid or anhydride functionalized polyolefin dispersion composition and the epoxy resin dispersion composition of the present invention, independently include 15 to 90 wt. % of the aqueous phase, based on the total weight of the composition. For example, the aqueous phase content may be in the range of from 30 to 80, or from 35 to 75, or from 40 to 70 wt. %, based on the total weight of the composition.

The compositions of the present invention may also be optionally be blended during or after processing with one or more additive or auxiliary polymer, such as one or more of an acrylic emulsion polymer, vinyl acrylic emulsion polymer, styrene acrylic emulsion polymer, vinyl acetate ethylene emulsion polymer, and combinations thereof; one or more fillers; one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; one or more lubricants such as fatty acid ester wax, silicon-containing wax, fluorine-containing wax, polyethylene or any other similar polyolefin wax, carnauba wax, lanolin wax or the like; one or more metallic fillers, such as aluminum, and zinc: one or more pigments, e.g. titanium dioxide, barium sulfate, mica, calcium carbonate, silica, zinc oxide, milled glass, aluminum trihydrate, talc, antimony trioxide, fly ash, and clay or the like; one or more co-solvents or coalescents, e.g. glycols, glycol ether, 2,2,4-trimethyl-1,3-pentanediol monoisobutyrate, alcohols, mineral spirits, aromatic solvents and benzoate esters or the like; one or more dispersants, e.g. aminoalcohols, and polycarboxylates; one or more surfactants; one or more corrosion inhibitors, such as polyphosphates and metaphosphates and their salts; one or more preservatives, e.g. biocides, mildewcides, fungicides, algaecides, and combinations thereof; one or more thickeners, e.g. cellulosic containing thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or one or more additional neutralizing agents, e.g. hydroxides, amines, ammonia, and carbonates; optionally one or more solvents or coalescing agents.

In addition, the compositions of the present invention may be blended with one or more dispersions, emulsions, suspensions, colloidal suspensions, and the like.

Preferably, to insure sufficient impact resistance and reverse impact resistance, the aqueous compositions of the present invention comprise an excess, such as a molar ratio of amine hydrogen equivalents or carboxylic acid groups of the one or more hardeners to moles of epoxy equivalents resin of the one or more epoxy resins in the (ii) epoxy resin dispersion of from 1.4:1 to 2.25:1.

The acid or anhydride functionalized polyolefin dispersion or its epoxy resin adduct and the epoxy resin dispersion of the present invention can be formed by any number of methods recognized by those having skill in the art. Generally, the functionalized polyolefin dispersion and the epoxy resin dispersion are formed separately and then are blended.

For making any polyolefin dispersion or epoxy resin dispersion, the dispersion equipment can be operated in batch, semi-batch, or continuous mode. Examples of mixers used in the dispersion include rotor-stator, microfluidizer, high pressure homogenizer, ultrasonic, impinging jet, Cowles blade, planetary mixers, and melt kneading devices such as extruders.

For example, any acid or anhydride functionalized polyolefin, epoxy adduct thereof, or mixture of the functionalized polyolefin and epoxy resin, and one or more anionic surfactant, as disclosed above, can be melt-kneaded in an extruder along with the aqueous phase (e.g., water). Or, the same materials can be first compounded without the aqueous phase, and then melt-kneaded in an extruder in the presence of the aqueous phase (e.g., water), and the anionic surfactant, thereby forming a dispersion.

A dispersion may first be diluted to contain 1 to 20 wt. %, e.g., 1 to 5 wt. % or 1 to 3 wt. %, of the aqueous phase and then, subsequently, further diluted to comprise greater than 25 wt. % of the aqueous phase.

Further dilution may be accomplished via water and/or a solvent as provided herein.

Melt-kneading devices known in the art may be used. For example, a kneader, a BANBURY mixer, single-screw extruder, or a multi-screw extruder, e.g. a twin screw extruder, is used. One example of a suitable extruder system is provided in PCT publication WO 2011/068525 entitled "Extruder Screw".

Methods for producing the functionalized polyolefin dispersion or the epoxy resin dispersion of the present invention are not particularly limited. For example, an extruder, in certain embodiments, for example, a twin screw extruder, is coupled to a back pressure regulator, melt pump, or gear pump. Exemplary embodiments also provide an initial aqueous phase reservoir, each of which includes a pump. Desired amounts of an initial aqueous phase are provided from the base reservoir and the initial aqueous phase reservoir, respectively. Any suitable pump may be used, for example, a pump that provides a flow of 150 cubic centimeters per minute (cc/min) at a pressure of 240 bar can be used to provide the base and the initial aqueous phase to the extruder. Or, a liquid injection pump provides a flow of 300 cc/min at 200 bar or 600 cc/min at 133 bar.

Any acid or anhydride functionalized polyolefin or epoxy adduct thereof, in the form of pellets, powder, or flakes, may be added additionally or exclusively to the aqueous phase stream or fed from the feeder to an inlet of the extruder where the base polymer is melted or compounded. The same goes for the epoxy resin. Any dispersing agent, or surfactant can also be fed simultaneously with the polyolefin or epoxy resin into the extruder via the feeder. In the alternative, the dispersing agent can be metered via an inlet prior to the emulsification zone into the molten compound including the polyolefin or epoxy resin. The surfactant can be added with the polyolefin or epoxy resin to the extruder, or the surfactant is provided separately to the extruder. The polymer melt is then delivered from the mix and convey zone to an emulsification zone of the extruder where the initial amount of aqueous phase and any base from the aqueous phase and base reservoirs are added through an inlet.

Further fluid media may be added via aqueous phase inlet from aqueous phase reservoir in a dilution and cooling zone of the extruder. Typically, the dispersion is diluted to at least 30 wt. % aqueous phase in the cooling zone. In addition, the diluted mixture may be diluted any number of times until the desired dilution level is achieved.

Any dispersion may further be cooled after exiting the extruder by the use of a suitable heat exchanger.

To reduce vapor pressure (e.g., steam pressure) build-up in the extruder and form a polyolefin dispersion in a secondary mixing device such as a rotor stator mixer, the aqueous phase is not added into the twin screw extruder but rather to a stream containing the melt after the melt has exited from the extruder and enters the secondary mixing device.

The compositions of the present invention can be formed in a continuous high shear mixer without the use of a melt kneading extruder. Thus, the first stream including one or more liquid or molten polymers is supplied to a continuous high shear mixer from a suitable liquid pump for example, a syringe pump, gear pump, or progressive cavity pump. The first stream is flowed through a first conduit and merged continuously with a second stream containing aqueous phase that is flowed through a second conduit. The first and second streams are merged into a disperser in the presence any or all of dispersing agent, modified polyolefin with the volatile base or neutralizing agent. These agents can be added to either the first or second stream, or as a separate stream. A third stream including the aqueous phase (e.g., water) can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rotations-per-minute (rpm) setting of the disperser can be used to help control the particle size of the dispersed hydrophobic phase in the dispersion. The system can be heated to provide the polymer and neutralizer components at a suitable viscosity for pumping. Steam formation is reduced by controlling the pressure through the use of a backpressure regulator, gear pump, metering pump, or other suitable device near the exit of the process. The dispersion may further be cooled after exiting the disperser by the use of a suitable heat exchanger.

In another variant of the methods of making the aqueous compositions of the present invention, the aqueous (i) functionalized polyolefin dispersions are formed by reacting the acid or anhydride functionalized polyolefin with epoxy so that an adduct of from 15 to 30 wt. %, for example, 19 to 28 wt. % epoxy is formed, followed by dispersing the adduct with a polyolefin in water to form a functionalized polyolefin dispersion and then mixing it with an aqueous epoxy dispersion composition.

In yet another process in a rotor stator, the aqueous compositions of the present invention may be made by dissolving the acid or anhydride functionalized polyolefin in from 100 to 400 parts by weight, based on the total weight of polyolefin and epoxy resin solids of a suitable solvent (i.e. toluene) for the epoxy resin and the polyolefin, dispersing that in water and removing the solvent, followed by blending it with an epoxy dispersion.

Yet still another process comprises dissolving an epoxy resin and the acid or anhydride functionalized polyolefin in a suitable solvent, dispersing that solution in water and evaporating or flashing to remove the solvent, e.g. via rotovaping, followed by blending the olefin/epoxy dispersion with an epoxy dispersion.

During the preparation of a composition from the acid or anhydride functionalized polyolefin dispersion and the epoxy dispersion of the present invention, any of the one or more fillers, extenders or pigments, one or more additives or auxiliary polymers, may be added to the polyolefin and second dispersions after the dispersion formulation process.

The compositions of the present invention may be applied to the substrates variety of methods; for example, via roller coating, spray coating, powder coating, dip coating, electro deposition coating, printing, wash coating, flow coating, curtain coating.

The thicknesses of the resulting coating layer can range from 1 micrometer ($\mu$m) to 250 $\mu$m, for example, from 2 $\mu$m or 3 $\mu$m to an upper limit of 150 $\mu$m, 200 $\mu$m or 250 $\mu$m. For example, the polyolefin dispersion composition may comprise from 1 $\mu$m to 150 $\mu$m, or from 1 $\mu$m to 200 $\mu$m, or from 1 $\mu$m to 250 $\mu$m, or from 2 $\mu$m to 150 $\mu$m, or from 2 $\mu$m to 200 $\mu$m, or from 2 $\mu$m to 250 $\mu$m, or from 3 $\mu$m to 150 $\mu$m, or from 3 $\mu$m to 200 $\mu$m or from 3 $\mu$m to 250 $\mu$m. One or more coating layers may be applied to a substrate.

The compositions of the present invention can be applied to the at least one surface of the substrate may be dried via a conventional drying method to form the coating layer. Such a conventional drying method includes but, is not limited to, air drying, convection oven drying, hot air drying, and/or infrared oven drying. The compositions applied to the at least one surface of a substrate may be dried, for example, at a temperature of from 10 to 250° C., such as room temperature, or ambient temperature, or from 80 to 200° C. The temperature of the composition applied to any substrate may be raised to a temperature in the range of equal or greater than the melting point temperature of the polyolefin polymer for a period of less than 40 minutes. For example, the temperature of the compositions applied to at least one surface of the substrate may be raised to a temperature in the range of equal or greater than the melting point temperature of the polyolefin in the polyolefin dispersion for less than 20 minutes, or less than 10 minutes, or for a period in the range of from 0.5 to 300 seconds.

Once applied to the substrate, the compositions of the present invention may be dried at a temperature in the range of room temperature to 180° C. for less than 40 minutes, for example, less than 20 minutes, or less than 10 minutes, or less than 5 minutes, or less than 2 minutes, or less than 1 minute or less than 20 seconds. For example, the composition applied to the at least one surface of a substrate may be dried at a temperature in the range of 60 to 100° C. for less than 40 minutes, for example, less than 20 minutes, or less than 10 minutes, or less than 5 minutes, or less than 2 minutes, or less than 1 minute, or in the alternative, the composition applied to the at least one surface of a substrate may be dried at a temperature in the range of 100 to 180° C. for a period of less than 40 minutes, for example, less than 20 minutes, or less than 10 minutes, or less than 5 minutes, or less than 2 minutes, or less than 1 minute.

Suitable substrates are steel, aluminum, wood, wood composites, such as oriented strand board, gypsum board, stone, cement, cement board, and other construction substrates, such as gypsum board glass mat facers.

EXAMPLES

The Examples that follow illustrate the present invention. Unless otherwise stated, in all of the Examples that follow, temperature is room temperature and pressure is atmospheric pressure.

Synthesis Examples: Dispersion Preparation:
Dispersions A to J

Aqueous dispersions A to J having compositions as disclosed in Table 2, below, were prepared from raw materials disclosed in Table 1, below, using the conditions as described in Table 2, below, using the following general procedure:

Components 1 to 3 listed in Table 2, below, were fed into a 25 mm diameter twin screw extruder using a controlled rate feeder; using the feed rate in grams/minute (g/min) as indicated in Table 2, below. Components 1 to 3 were forwarded through the extruder and melted to form a liquid melt material.

The extruder temperature profile was ramped up to the temperature listed in the "Polymer Melt Zone" column of Table 2, below. Water and volatile base and/or neutralizing agent were mixed together and fed to the extruder at a rate indicated in Table I for neutralization at an initial water introduction site. Then dilution water was fed into the extruder in one or two locations ($1^{st}$ and $2^{nd}$ locations) via two separate pumps at the rates indicated in Table 2. The extruder temperature profile was cooled back down to a temperature below 100° C. near the end of the extruder. The extruder speed was around 470 rpm in most cases as recorded in Table 2. At the extruder outlet, a backpressure regulator was used to adjust the pressure inside the extruder barrel to a pressure adapted to reduce steam formation (generally, the pressure was from 2 MPa to 4 MPa).

Each aqueous dispersion exited from the extruder and was filtered through a 200 micrometer (μm) filter. The resultant filtered aqueous dispersions had a solids content measured in weight percent (wt %); and the solids particles of the dispersion had a volume mean particle size measured in microns and recorded in Table 2, below. In some cases the particle size mode is also recorded. The solids content of the aqueous dispersion was measured using an infrared solids analyzer; and the particle size of the solids particles of the aqueous dispersion was measured using a COULTER™ LS-230 particle size analyzer (Beckman Coulter Corporation, Fullerton, Calif.). The solids content and the average particle size (PS) of the solids particles of the indicated dispersions are indicated in Table 2.

TABLE 1

Raw Materials for Polyolefin Dispersions

| Material | Composition | Melting Point (° C.) | Melt Index | Density (g/cm³) | TE* (%) |
|---|---|---|---|---|---|
| Polyolefin 1 | Ethylene/ethylacrylate copolymer (20% EA) | 95 | 21[1] | 0.93 | 750 |
| Polyolefin 3 | Ethylene/octene olefin plastomer | 68 | 1000 | 0.87 | 110 |
| Polyolefin 2 | Ethylene/octene olefin plastomer, maleic anhydride grafted (MAH-g) at 1 wt. % | 68 | 660 | 0.878 | 170 |
| Base 1 | Dimethyl ethanolamine (DMEA) | | | | |
| Base 2 | Potassium hydroxide (KOH) | | | | |
| Surfactant 1 | Sodium laureth (2EO) sulfate anionic surfactant (70% w/w in water) | | | | |
| Polyolefin 4 | Ethylene/octene olefin plastomer | 59 | 5[1] | 0.87 | >600 |
| Polyolefin 5 | Ethylene/octene olefin elastomer | 60 | 30 | 0.87 | 1000 |
| Acid dispersing agent | (80/20) Long chain (26C) linear primary carboxylic acid/polyethylene | 92 | 120 | — | |
| Epoxy Resin 1 | Bisphenol A diglycidyl ether type IV Epoxy resin (EEW 875-955) | — | — | — | — |
| Epoxy Resin 2 | Bisphenol A diglycidyl ether type I Epoxy resin, EEW 475-500 | | | | |
| Hardener | Modified aliphatic amine (AHEW = 280) | — | — | — | — |
| Betaine surfactant | Lauramidopropyl betaine | — | — | — | — |
| Epoxy Dispersion 1 | Aqueous dispersion of Epoxy Resin 2 including, as solids, ~11 phr of a surfactant combination of an anionic surfactant di-epoxy functional non-ionic surfactant. | | | | |
| Surfactant 2 | Ammonium nonylphenol ether sulfate surfactant (Rhodapex ™,[2] Co 436 surfactant) | | | | |

*Tensile elongation at break;
[1] 5 g/10 min at 190° C.;
[2] Rhodia Solvay Group, Cranbury, NJ.;

TABLE 2

Composition and Extrusion Conditions for Aqueous Dispersions

| Example | Component 1 feed rate (g/min) | Component 2 feed rate (g/min) | Component 3 feed rate (g/min) | Initial Water feed rate (g/min) | Base/Surfactant feed rate (g/min) | Dilution Water feed rate (g/min) | Extruder Temp. in Polymer Melt Zone (° C.) | Extruder Speed (rpm) | Solids (wt. %) | $V_{mean}$ P.S. (μm) | pH | Viscosity (cP, Rv3, 50 rpm) |
|---|---|---|---|---|---|---|---|---|---|---|---|---|
| A* | Polyolefin 1 (108.9) | n/a | Acid dispersing agent (4.5) | (2.4) | 30 wt. % KOH (1.6) | 100 | 160 | 800 | 54.3 | 1.2 | 11.3 | 202 |
| B* | Polyolefin 1 (107.5) | n/a | Acid dispersing agent (9.28) | (3.05) | DMEA (2.33) | 132.3 | 150 | 450 | 46.2 | 1.4 | 10.1 | 328 |
| C | Polyolefin 2 (56.3) | n/a | n/a | (1.75) | Surfactant 1 (3.3) | 58 | 90 | 470 | 46.2 | 0.7 | 3.9 | n/m |
| D* | Polyolefin 2 (90.4) | Polyolefin 2 (17.2) | Acid dispersing agent (4.54) | (3.18) | 30 wt. % KOH (1.7) | 122.2 | 150 | 450 | ~50 | 0.547 | 10.9 | 93 |
| E* | Polyolefin 2 (90.1) | Polyolefin 2 (17.8) | Acid dispersing agent (9.38) | (7.62) | DMEA (2.78) | 110.8 | 150 | 450 | 48.1 | 0.446 | 9.9 | 276 |
| F | Polyolefin 2 (90.4) | n/a | n/a | (2.96) | Surfactant 1 (5.56) | 101.7 | 80 | 450 | 46.9 | 0.5 | 3.5 | 100 |
| G* | Polyolefin 3 (56.3) | n/a | n/a | (1.75) | Surfactant 1 (3.3) | 58 | 90 | 470 | 49.5 | 0.9 | 10.4 | 276 |
| H* | Polyolefin 5 (90.4) | Polyolefin 2 (17.5) | n/a | (4.55) | Surfactant 1 (6.66) | 109 | 140 | 450 | 52.36 | 0.699 | 4.55 | 458 |
| I | Polyolefin 2 (57.0) | Epoxy Resin 1 (14.2) | n/a | (2.3) | Surfactant 1 (4.4) | 75 | 110 | 470 | 48.7 | 1.2 | 3.8 | 126 |
| J* | Polyolefin 2 (49.8) | Epoxy Resin 1 (21.3) | n/a | (2.3) | Surfactant 1 (4.4) | 75 | 110 | 470 | 49.0 | 0.8 | 3.9 | 191 |

*denotes Comparative Example.

TABLE 3

Composition of Rotor/Stator Epoxy Resin And Functionalized Polyolefin Dispersions

| Example | Component 1 feed rate (g/min) | Initial Water feed rate (g/min) | Surfactant 2 feed rate (g/min) | Dilution Water feed rate (g/min) | Mixer Temp. in Emulsification Zone (° C.) | Mixer Speed (rpm) | Solids (wt. %) | $V_{mean}$ P.S. (nm) | pH | Viscosity |
|---|---|---|---|---|---|---|---|---|---|---|
| K | (91%/5% Polyolefin 2/Epoxy dispersion 1 25%), Toluene 75% 60 g/min | 4.5 g/min | 2.4 g/min | 58.0 g/min | 80 | 400 rpm | 50% | 400 | Not Determined | Not Determined |
| L | (81%/15%) Polyolefin 2/Epoxy dispersion 1) Toluene 75% 60 g/min | 4.5 g/min | 2.4 g/min | 58.0 g/min | 80 | 400 rpm | 50% | 400 | Not Determined | Not Determined |

Epoxy Dispersion 1:

Separately from the polyolefin dispersions in Table 2, above, Epoxy Dispersion 1 in Table 1, above, was formed by pre-blending a Type I epoxy resin (Epoxy Resin 2) with a di-functional epoxy group containing nonionic surfactant at a ratio of 89.52:9.17 in a jacketed reactor at 95° C. Once uniform, the material was cooled to 80° C. The cooled pre-blend material was then pumped to a 125 mm (4 inch) rotor/stator mixer at a flow rate of 60 g/min through a heated feed line (80° C.) using a Witte gear pump (Witte Pumps and Technology GmbH, Lawrenceville, Ga.). A stream of an anionic sulphosuccinate surfactant was pumped to the rotor/stator mixer at 1.31 g/min. Water was also added to the mixer at 10 g/min. The rotor/stator mixer was operated at 750 rpm, resulting in stable waterborne epoxy dispersion. The resulting high internal phase emulsion was then diluted in a second rotor stator with additional water to achieve a 47 wt. % solids dispersion and an average particle size of ~0.5 microns.

Aqueous Epoxy Dispersion Compositions K and L:

In Table 3, above, aqueous dispersion compositions of Example K and L, which contained 5 wt. % and 15 wt. %, respectively, of epoxy resin 1, were prepared using a rotor/stator device. In the preparation, separately, the indicated epoxy resin and polyolefin resin were placed in a 20 liter fluted Rotavapor™ flask (Model Buchi R-220, Buchi Corporation, New Castle, Del.) with the indicated amount of solvent (75 wt. % toluene in Example K), based on the total weight of the compositions and heated at 90° C. until the tumbled material became a uniform polymer blend. The blend was then transferred to the resin feed tank of a dispersion apparatus having a first a 125 mm (4 inch) stainless steel rotor/stator mixer and a second a 125 mm (4 inch) stainless steel rotor/stator mixer, wherein the first rotor stator mixer was fitted with a rotor that has every other tooth removed on both sides and the second rotor/stator was fitted with an every row/every tooth rotor design. The resin feed tank and a polymer line leading into the first rotor/stator mixer were each set at a temperature of 70° C. A 200 mPA (30 psig) nitrogen head pressure was placed on the feed tank to assist the blend reaching the feed pump. The polymer blend was then pumped into the dispersion apparatus using a standard Zenith gear pump (BPB Series, capacity=1.752 cc/rev, Colfax Corp., Monroe, N.C.). The gear pump was set at 45 Hz to get a feed rate of 60 g/min. The gear pump was heated to 70° C., with heat tracing, to heat the polymer blend. The heated polymer blend was introduced to the first rotor-stator mixer. Surfactant 2 (Table 1, above) was fed into the polymer line just upstream of the initial aqueous (IA) addition and entrance to the first rotor stator using an Isco syringe pump (Teledyne Isco, Lincoln, Nebr.). The IA, deionized water, was added coaxially with the polymer and was pumped using an Altech™ 301 HPLC pump (Alltech Supply, Inc., Woodridge, Ill.). The frequency of the rotor/stator was set at 700 rpm. The head jacket was cooled with a Neslab™ RTE 20 bath (Thermo Fisher Scientific, Waltham, Mass.) set to 20° C. The IA was started at a feed ratio of ~1:1 of the ratio of total polymer or resin solids plus surfactants, considered as solids, or "Oil to IA". The amount of IA was then slowly lowered to increase high internal phase emulsion (HIPE) solids level. As the solids level increased, the average particle size became smaller and the Oil to IA ratio approached the inversion point where the system went from an oil in water emulsion to a water in oil emulsion. This gradual decrease in IA allowed a systematic lowering of the particle size to the desired size. In this case, the smallest, most narrow particle size distribution was achieved at 93 wt. % HIPE solids. The HIPE was then pumped to the second rotor/stator and diluted with DI water to the desired, 50 wt. % solids (including toluene as solids). The dispersion was poured into a rotary evaporator flask (Buchi R220) and stripped. Water was back added 3 times and stripped off to assure that the level of toluene in the dispersion was minimal. After the final strip the solids was adjusted to 50 wt. %. Particle size was re-measured to assess any changes during solvent removal.

Several aqueous dispersions were formulated from the functionalized polyolefin dispersion as indicated in Tables 2 and 3, above, and Epoxy Dispersion 1, together in the proportions indicated in Tables 4 and 5, below, by simple mixing. In Tables 4 and 6A, below, the ratio of total amine hydrogen equivalents in the hardener to the total epoxy equivalents of the epoxy resin is 2:1; and in Tables 5 and 6B, below, the ratio of total amine hydrogen equivalents in the hardener to the total epoxy equivalents of the epoxy resin is 1:1. The test results are reported in Tables 6A, 6B, 7, and 9, below, with Examples numbered using a convention wherein the first letter of the Example is the polyolefin dispersion from one of Table 2 or Table 3, above, and the second character of the Example is the proportion indicated in one of Tables 4 and 5, below. For example, Example "F-1" has polyolefin dispersion F from Table 2, above, in the proportions of 70 wt. % epoxy solids, as indicated in Example proportion 1 in Table 5, below.

TABLE 4

Blend Ratios of Polyolefin Dispersions
A to E (Table 2) and Epoxy Dispersion 1

| Example Proportion | Wt % Epoxy solids | Wt. % Polyolefin solids | g Epoxy solids | g Hardener |
| --- | --- | --- | --- | --- |
| 1 | 70 | 30 | 14 | 16.07 |
| 2 | 80 | 20 | 16 | 18.46 |
| 3 | 90 | 10 | 18 | 20.88 |
| 4 | 95 | 5 | 19 | 22.10 |

TABLE 5

Blend Ratios of Polyolefin Dispersions F to
K (Tables 2 and 3) and Epoxy Dispersion 1

| Example | Wt % Epoxy solids | Wt. % Polyolefin solids | g Epoxy solids | g Hardener |
| --- | --- | --- | --- | --- |
| 1 | 70 | 30 | 14.00 | 7.82 |
| 2 | 80 | 20 | 16.00 | 8.93 |
| 3 | 90 | 10 | 18.00 | 10.05 |
| 4 | 95 | 5 | 18.98 | 10.60 |

Coating Preparation:

Films of each Example were made using a 152.4 micron (6 mil) drawdown bar on phosphate treated steel panels and cured at room temperature for 7 days.

Test Methods:

The following test methods were used in the Examples:

Particle Size Measurement:

Particle size was measured using a COULTER™ LS-230 or COULTER LS-13-320 particle size analyzer (Beckman Coulter Corporation). The volume average particle size of the polyolefin dispersions were determined.

Percent Solids:

Percent solids was measured using a microwave solids analyzer or an infrared solids analyzer. One analyzer used was the OHAUS™ MB45 infrared moisture analyzer (Ohaus Corporation, Parsippany, N.J.).

Adhesion:

The "cross-hatch adhesion" of the indicated coating layer on a coated panel was measured according to ASTM-D 3359-08 (2008). This method includes making a square lattice pattern with 10 cuts in each direction with 1 millimeter (mm) distance between neighboring cuts on the coating layer. A pressure sensitive tape over the cut area is applied and then the tape is pulled parallel to the substrate surface. Adhesion is evaluated by visual observation and designating the results using a scale from "OB" to "5B" as described in Table 5-1, below, with "5B" indicating perfect adhesion to the substrate and "OB" indicating complete removal of the coating from the substrate.

TABLE 5-1

Cross-Hatch Adhesion

| Rating | Description |
| --- | --- |
| 5B | The edges of the cuts are completely smooth; none of the squares of the lattice is detached. |
| 4B | Small flakes of the coating are detached at intersections; less than 5% of the area is affected. |
| 3B | Small flakes of the coating are detached along the edges and at intersections of cuts. The area affected is 5-15% of the lattice. |

TABLE 5-1-continued

Cross-Hatch Adhesion

| Rating | Description |
|---|---|
| 2B | The coating has flaked along the edges and on parts of the squares. The area affected is 15-35% of the lattice. |
| 1B | The coating has flaked along the edges of cuts in large ribbons and whole squares have detached. The area affected is 35-65% of the lattice. |
| 0B | Flaking and detachment is worse than 1B. |

Solvent Resistance (MEK Double Rub):

The solvent resistance of the indicated coating layer on a coated panel was tested according to ASTM D4752 (2015) using methyl ethyl ketone (MEK). In this method, samples are tested using a piece of cotton cheesecloth attached with copper wire to a 0.68 kg hammer. The cheesecloth was saturated with MEK and then placed on the coating. The hammer was pushed forward and then back at a rate of approximately 1 second per cycle. The coating layer was visually inspected after every 20 double rub cycle for any signs of damage or delaminating. This procedure was repeated until a bare panel is showing (at this observation point, record the number of double rubs as the MEK double rub (DR) result for the sample) or until a total of 200 double rubs is reached. Alternatively, an automated tester, available from DJH Designs may be used to measure the number of double rubs. The automated tester works in a semi-automatic fashion by moving a cotton pad, attached to a weighted block, that applies about 0.15 kg/cm$^2$ pressure, in a back and forth motion across the coated panel. Each back and forth is referred to as one double rub.

Impact Resistance:

The impact resistance of the coating layer was measured using a GARDNER™ falling weight impact tester (Byk Gardner Inc., Columbia, Md.) according to ASTM D-2794 (2010). In this method, indentation in both direct and indirect modes was measured; and the units of measure are kg-cm (inch-lbs).

Pendulum Hardness:

Performed following ASTM D4366-95 (1995) using a BYK Pendulum Hardness tester.

Corrosion Resistance:

Corrosion resistance was measured by comparing field rusting and corrosion along the scribe after a certain number of exposure hours, and comparing the samples to a control consisting of just the epoxy dispersion. The salt fog cabinet settings were consistent with ASTM B117-11: Standard Practice for Operating Salt Spray (Fog) Apparatus (2011). The test results are presented in Table 6A, 6B and 7 below.

TABLE 6A

Performance of Polyolefin and Epoxy Dispersions at Various Ratios

| Example | Pendulum Hardness | 20° Gloss | 60° Gloss | MEK Double Rubs | Forward Impact | Reversed Impact |
|---|---|---|---|---|---|---|
| A-1* | 124 | 27 | 68 | 90 | 80 | 140 |
| A-2* | 132 | 64 | 89 | 102 | 140 | 140 |
| A-3* | 150 | 86 | 98 | 121 | 120 | 140 |
| A-4* | 139 | 99 | 105 | 150 | 120 | 160 |
| B-1* | 87 | 27 | 68 | 80 | 60 | <20 |
| B-2* | 110 | 67 | 93 | 130 | 60 | <20 |
| B-3* | 141 | 97 | 101 | 200 | 60 | 160 |
| B-4* | 150 | 100 | 104 | 150 | 40 | 160 |
| C-1 | 124 | 78 | 94 | 200 | 60 | 160 |
| C-2 | 127 | 91 | 98 | >200 | 160 | 160 |
| C-3 | 111 | 97 | 100 | 150 | 160 | 160 |
| C-4 | 141 | 101 | 103 | >200 | 80 | 160 |
| D-1* | 63 | 24 | 69 | 83 | 120 | 40 |
| D-2* | 113 | 92 | 99 | 150 | 80 | 30 |
| D-3* | 124 | 96 | 101 | 200 | 120 | 50 |
| D-4* | 140 | 100 | 107 | 200 | 80 | 40 |
| E-1* | 48 | 98 | 100 | 200 | 30 | 40 |
| E-2* | 103 | 99 | 101 | 200 | 50 | 30 |
| E-3* | 118 | 103 | 104 | 200 | 60 | 30 |
| E-4* | 127 | 108 | 108 | 200 | 80 | 40 |
| Epoxy Dispersion 1*, ** | 133 | 111 | 120 | 200 | 100 | 70 |

*Indicates comparative;
** Epoxy Dispersion 1 from Table 1, above.

As shown in Table 6A, above, Inventive Examples C-1 through C-4 have improved impact resistance over the epoxy control without significant loss in gloss, hardness, and MEK double rubs, whereas the comparative Examples A, B, D, and E have poorer impact resistance, especially reverse impact resistance, relative to the control and the inventive Examples C-1 to C-4. Further, the overall MEK double rubs and forward and reverse impact was improved through use of an excess of amine hydrogen equivalents of hardener.

TABLE 6B

Performance of Polyolefin and Epoxy Dispersions at Various Ratios

| Example | Wt % polyolefin | Pendulum Hardness | 20° Gloss | 60° Gloss | MEK Double Rubs | Forward Impact | Reverse Impact |
|---|---|---|---|---|---|---|---|
| F-3 | 10 | 66 | 94.2 | 101 | 18 | 30 | <2 |
| F-4* | 5 | 75 | 106 | 108 | 19 | 22 | <2 |
| Epoxy dispersion 1*, 1 | 0 | 85 ± 21 | 125 ± 7 | 144 ± 24 | 24 ± 4 | 16 ± 8 | <2 |
| G-1* | 30 | 65 | 4.9 | 30.8 | 11 | 24 | <2 |
| G-2* | 20 | 74 | 2.6 | 17.1 | 17 | 13 | <2 |
| G-3* | 10 | 93 | 11.5 | 47.4 | 21 | 13 | <2 |
| G-4* | 5 | 96 | 42.9 | 89.9 | 25 | 15 | <2 |
| H-1* | 5 | 126 | ND | ND | 400 | 10 | <10 |
| H-2* | 10 | 70 | ND | ND | 300 | 10 | <10 |
| H-3* | 15 | 141 | ND | ND | 200 | 10 | <10 |

*Denotes Comparative.
[1] Epoxy dispersion 1 was run in duplicate.

As shown in Table 6B, above, the impact resistance of the inventive Examples F-3 and F-4 have better forward impact resistance than proper Comparative Examples G-3, G-4 and H-3. However, the F-3 and F-4 MEK resistance is not improved, thereby suggesting that where the average particle size of the polyolefin particles and the epoxy resin particles in F-3 and F-4 are the same, the two dispersions do not readily mix together sufficiently well. In the H-1, H-2 and H-3 compositions, it appears that the polyolefin does not disperse into the epoxy continuous phase of the compositions and instead have polyolefin on the surface and so exhibit lower gloss but give dramatically improved MEK resistance.

TABLE 7

Performance of Polyolefin Epoxy Dispersions

| Example | Wt. % POD | Pendulum Hardness | MEK | Adhesion | Forward Impact | Reverse Impact |
|---|---|---|---|---|---|---|
| I-1 * | 5 | 122 | 90 | 5 | 15 | <10 |
| I-2 * | 10 | 115 | 60 | 5 | 22 | <10 |
| I-3 | 15 | 126 | 500 | 5 | 27 | <10 |
| K-1 * | 5 | 134 | 80 | 5 | 10 | <10 |
| K-2 * | 10 | 133 | 80 | 5 | 10 | <10 |
| K-3 | 15 | 132 | 150 | 5 | 20 | <10 |

Comparative Examples I-1 and I-2 and K1 and K2 provide no improvement in impact resistance, or MEK resistance, whereas inventive Example 1-3 (at 15 wt. % POD solids) provide improved MEK and impact resistance relative to the epoxy dispersion 1 control in Table 6B, above. The data suggest that the average particle size of the functionalized polyolefin dispersion K in Comparatives K-1 to K-3 is too large. The data also suggest that functionalized polyolefin dispersions that are epoxy adducts as in dispersion 1 should be used in preferred larger amounts of 10 to 18 wt. % of polymer and resin solids.

TABLE 8

Formulation For Coating

| Part A | Weight (g) | Wt. % |
|---|---|---|
| Epoxy Dispersion 1 | 99.245 | 23.71 |
| water | 12.19 | 2.91 |
| Flash Rust Inhibitor[1] | 4.47 | 1.07 |
| Dispersant[2] 190 | 14.59 | 3.49 |
| Defoamer[3] | 0.995 | 0.24 |
| TiO$_2$ Pigment | 118.625 | 28.34 |
| grind to 7+ | | |
| Let Down | | |
| Epoxy Dispersion 1 | 166.235 | 39.72 |
| Defoamer | 2.185 | 0.52 |
| let down | | |
| Total | 418.535 | |

[1]Flash X ™ material, ICL Advanced Additives;
[2]Disperbyk ™ material, BYK Additives & Instruments;
[3]Byk ™ 019 material, BYK Additives & Instruments;
4. RCL ™ 9 pigment, Cristal Corporation;
5. TegoFoamex ™ 823 defoamer, Evonik Industries.

After making the above formulation, a known amount of POD was added to obtain the wt. % polyolefin solids listed in parentheses in Table 9, below.

TABLE 9

Performance of Fully Formulated Coatings

| Example | Pendulum Hardness | Adhesion | MEK | Impact | Reverse Impact |
|---|---|---|---|---|---|
| H-1 (5%) | 100 | 5 | 180 | 80 | <10 |
| H-2 (10%) | 86 | 5 | 90 | 40 | <10 |
| H-3 (15%) | 103 | 5 | 120 | 120 | <10 |
| C-1 (5%) | 106 | 5 | 60 | 100 | <10 |
| C-2 (10%) | 95 | 5 | 35 | 105 | <10 |
| C-3 (15%) | 84 | 5 | 30 | 100 | <10 |
| F-1(5%) | 96 | 5 | 240 | 60 | <10 |
| F-2 (10%) | 100 | 5 | 300 | 50 | <10 |
| F-3 (15%) | 93 | 5 | 150 | 50 | <10 |
| Epoxy Dispersion 1 * | 86 | 4 | 100 | 60 | <10 |

* Denotes Comparative Example

As shown in Table 9, above, formulations of the inventive Examples C-1 to C-3 deliver improved impact resistance, hardness, and adhesion versus the Epoxy Dispersion 1, and formulations of the inventive Examples F-1 to F-3 have improved MEK resistance with similar impact resistance to the Epoxy Dispersion 1. This shows that formulated compositions having pigments, fillers and extenders perform distinctively from compositions that are not formulated. A formulation of the inventive Example H-3 exhibits improved MEK, impact resistance, hardness, and adhesion versus the control epoxy, while a formulation of inventive Example H-1 delivers improved impact resistance and much improved MEK resistance; and a formulation of inventive Example H-2 delivers better adhesion and decent MEK resistance.

We claim:

1. An aqueous composition for forming polyolefin particles dispersed in an epoxy matrix comprising a blend of (i) from 2 to 30 wt. %, based on the total weight of solids in the composition, of a functionalized polyolefin having an average particle size of from 0.2 to 5 microns wherein the functionalized polyolefin consists of an acid functionalized or anhydride functionalized polyolefin elastomer, an acid functionalized or anhydride functionalized high density polyethylene, an acid functionalized or anhydride functionalized ethylene-propylene copolymer, an acid functionalized or anhydride functionalized polypropylene, an acid functionalized or anhydride functionalized polyolefin plastomer, an acid functionalized or anhydride functionalized linear low density polyethylene, an acid functionalized or anhydride functionalized ethylene-C4 to C12 olefin copolymer, or a combination thereof, wherein the acid or anhydride functionalized polyolefin has an acid number of 5 to 60 and (ii) a dispersion of one or more epoxy resins having an epoxy equivalent weight of from 150 to 4,000 and having an average particle size of from 0.2 to 1.0 microns, wherein the functionalized polyolefin is stabilized in the composition with from 2 to 8 wt. %, based on the total weight of solids in the composition, of one or more anionic surfactants, and, further wherein, the composition has a pH of from 3 to 8, wherein the particle size ratio of the functionalized polyolefin to the epoxy resin ranges from 10:1 to 1:1.

2. The aqueous composition as claimed in claim 1, wherein the particle size ratio of the (i) functionalized polyolefin to the (ii) epoxy ranges from 7:1 to 1.7:1.

3. The aqueous composition as claimed in claim 1, wherein the (i) acid or anhydride functionalized polyolefin contains from 0.1 to 2.0 wt. % of acid or anhydride groups, based on the total solids weight of the functionalized polyolefin.

4. The aqueous composition as claimed in claim 3, wherein the acid or anhydride functionalized polyolefin contains, in polymerized form, maleic anhydride groups.

5. The aqueous composition as claimed in claim 4 wherein the aqueous composition is substantially solvent free.

6. The aqueous composition as claimed in claim 3 wherein the aqueous composition is substantially solvent free.

7. The aqueous composition as claimed in claim 1, wherein the (ii) epoxy resin dispersion comprises at least one epoxy resin which is a linear or difunctional glycidyl ether of a polyol.

8. The aqueous composition as claimed in claim 7 wherein the aqueous composition is substantially solvent free.

9. The aqueous composition as claimed in claim 1, further comprising a hardener for the epoxy resin.

10. The aqueous composition as claimed in claim 9 wherein the aqueous composition is substantially solvent free.

11. The aqueous composition as claimed in claim 1, wherein the (the anionic surfactant comprises a lauryl sulfate alkali metal salt or an ethoxylated lauryl sulfate alkali metal salt.

12. The aqueous composition as claimed in claim 11 wherein the aqueous composition is substantially solvent free.

13. The aqueous composition as claimed in claim 1 wherein the aqueous composition is substantially solvent free.

14. A method comprising applying the aqueous composition of claim 1 to a construction substrate and drying to form a coating layer wherein the particles of the acid or anhydride functionalized polyolefin or epoxy adduct thereof is dispersed in the epoxy resin matrix.

15. The method of claim 14 wherein the construction substrate is selected from steel, aluminum, wood, wood composites, gypsum board, stone, cement, cement board, and glass mat facers and/or the coating layer has a thickness of 1 to 250 microns.

16. The aqueous composition of claim 1 wherein the functionalized polyolefin consists of an anhydride functional copolymer of ethylene and C4-C20 olefin.

17. A method of making an aqueous composition comprising providing an epoxy resin in the form of melt, pellets, powder or flakes and water, extruding or melt kneading the epoxy resin in the water with one or more surfactant, to form (ii) an aqueous epoxy resin dispersion, and, separately, providing an acid or anhydride functionalized polyolefin or an epoxy adduct thereof, in the form of melt, pellets, powder or flakes and extruding or kneading the acid or anhydride functionalized polyolefin or the epoxy adduct thereof in water with an anionic surfactant to form a (i) functionalized polyolefin dispersion and blending the (i) functionalized polyolefin dispersion in an amount of 2 to 30 wt. %, based on the total weight of solids in the composition with (ii) the epoxy dispersion.

* * * * *

UNITED STATES PATENT AND TRADEMARK OFFICE
CERTIFICATE OF CORRECTION

| | | |
|---|---|---|
| PATENT NO. | : 11,447,600 B2 | Page 1 of 1 |
| APPLICATION NO. | : 16/092458 | |
| DATED | : September 20, 2022 | |
| INVENTOR(S) | : Robert R. Bills et al. | |

It is certified that error appears in the above-identified patent and that said Letters Patent is hereby corrected as shown below:

On the Title Page

Item [30] insert:
--Application No.: 62/330430 Filing Date: 05-02-2016--

Signed and Sealed this
Fifteenth Day of November, 2022

Katherine Kelly Vidal
Director of the United States Patent and Trademark Office